(12) United States Patent
Bachmaier et al.

(10) Patent No.: US 10,072,677 B2
(45) Date of Patent: Sep. 11, 2018

(54) ACTUATOR DEVICE AND METHOD FOR SETTING A POSITION OF A LINEARLY MOVABLE ELEMENT

(71) Applicant: SIEMENS AKTIENGESELLSCHAFT, Munich (DE)

(72) Inventors: Georg Bachmaier, Munich (DE); Gerit Ebelsberger, Munich (DE); Reinhard Freitag, Munich (DE); Andreas Goedecke, Munich (DE); Wolfgang Zoels, Munich-Lochhausen (DE)

(73) Assignee: SIEMENS AKTIENGESELLSCAHFT, Munich (DE)

( * ) Notice: Subject to any disclaimer, the term of this patent is extended or adjusted under 35 U.S.C. 154(b) by 465 days.

(21) Appl. No.: 14/396,505

(22) PCT Filed: Apr. 25, 2013

(86) PCT No.: PCT/EP2013/058621
§ 371 (c)(1),
(2) Date: Oct. 23, 2014

(87) PCT Pub. No.: WO2013/160398
PCT Pub. Date: Oct. 31, 2013

(65) Prior Publication Data
US 2015/0113976 A1 Apr. 30, 2015

(30) Foreign Application Priority Data
Apr. 25, 2012 (DE) .................. 10 2012 206 834

(51) Int. Cl.
*F04B 17/03* (2006.01)
*F15B 7/08* (2006.01)
(Continued)

(52) U.S. Cl.
CPC ............... *F15B 7/08* (2013.01); *F04B 17/03* (2013.01); *H02N 2/043* (2013.01); *F15B 15/18* (2013.01)

(58) Field of Classification Search
CPC .... F04B 17/03; F02M 2200/70; F02M 63/00; F02M 63/0026; F02M 2200/703
See application file for complete search history.

(56) References Cited

U.S. PATENT DOCUMENTS

| | | |
|---|---|---|
| 6,851,355 B2 | 2/2005 | Harada et al. |
| 2002/0023535 A1 | 2/2002 | Harada et al. |

FOREIGN PATENT DOCUMENTS

| | | |
|---|---|---|
| DE | 20 2004 005 410 U1 | 7/2004 |
| DE | 10 2008 046 562 A1 | 3/2010 |

(Continued)

OTHER PUBLICATIONS

German Language Translation of Japanese Office Action for related Japanese Patent Application No. 2015-507533, dated Sep. 18, 2015, 4 pages.

(Continued)

*Primary Examiner* — F. Daniel Lopez
*Assistant Examiner* — Abiy Teka
(74) *Attorney, Agent, or Firm* — Slayden Grubert Beard PLLC

(57) ABSTRACT

An actuator device for producing a linear movement, has a hydraulic actuator which includes a first piston element for actuating the actuator and a second piston element for producing the linear movement. The piston elements are assigned respective fluidically coupled working chambers, the volumes of which can be changed by movement of the respective piston element. A piezoelectric actuator is provided for exerting a force on the first piston element.

9 Claims, 4 Drawing Sheets

(51) Int. Cl.
*H02N 2/04* (2006.01)
*F15B 15/18* (2006.01)

(56) References Cited

FOREIGN PATENT DOCUMENTS

| | | | |
|---|---|---|---|
| DE | 10 2009 029 972 A1 | 12/2010 | |
| DE | 102010027278 A1 * | 1/2012 | ......... F02M 63/0026 |
| EP | 1 190 829 A2 | 3/2002 | |
| JP | 34-9915 | 11/1959 | |
| JP | 37-5931 | 4/1962 | |
| JP | 61-211157 | 9/1986 | |
| JP | 62-28507 | 2/1987 | |
| JP | 3-125852 | 12/1991 | |
| JP | 2000-314402 | 11/2000 | |
| JP | 2000314402 A * | 11/2000 | |
| JP | 2001-12402 | 1/2001 | |
| RU | 1383013 A1 | 3/1988 | .............. F15B 11/12 |
| RU | 2184282 C2 | 6/2002 | ................ F15B 9/03 |
| WO | 96/22466 A2 | 7/1996 | ................ F01L 9/02 |

OTHER PUBLICATIONS

Chinese Office Action for related Chinese Patent Application No. 201380021691.7, dated Aug. 17, 2015, 13 pages.
Japanese Decision to Grant, Application No. 2015507533, 2 pages, dated Aug. 1, 2016.
Office Action dated Feb. 26, 2013 for corresponding German Patent Application No. 10 2012 206 834.1.
International Search Report dated Sep. 30, 2013 for corresponding International Patent Application No. PCT/EP2013/058621.

* cited by examiner

ACTUATOR DEVICE AND METHOD FOR SETTING A POSITION OF A LINEARLY MOVABLE ELEMENT

CROSS REFERENCE TO RELATED APPLICATIONS

This application is based on and hereby claims priority to International Application No. PCT/EP2013/058621 filed on Apr. 25, 2013 and German Application No. 10 2012 206 834.1 filed on Apr. 25, 2012, the contents of which are hereby incorporated by reference.

BACKGROUND

The invention relates to an actuator device for producing a linear movement and to a method for setting a position of a linearly movable element.

For certain adjustment tasks, there is a need for actuators by which linear adjustments that are as precise as possible can be performed. Ideally, such actuators are as small as possible, operated electrically, resistant to environmental conditions, especially contamination, and as wear resistant as possible.

It is known that such adjustment tasks can be performed manually with some effort and that electromagnetic linear actuators, spindle drives or pneumatic/hydraulic actuators can be provided. The use of piezoelectric or magnetoresistive actuators is also known. For relatively large deflections, piezoelectric actuators which operate on the caterpillar or inchworm principle are also known. For this purpose, three actuators are generally required, namely a clamping actuator element at the front and rear and an actuator element for forward motion.

Known actuators are generally complex and are not resistant to contamination and wear.

In addition to the actuator types described above, the related art also includes a linear drive which manages with just a mass, a clamping device and a single actuator element. A piezoelectric actuator is positioned between the mass and the clamping device and is supplied with a rising voltage in such a way that the deflection force resulting therefrom accelerates the mass but the force remains below the static friction force of the clamping device on which the actuator is supported. When the maximum deflection of the piezoelectric element is reached, the control voltage is reduced so quickly that the resulting contraction of the piezoelectric element leads to a negative acceleration force which, although it reduces the movement of the mass, is so great that the static friction of the clamping device is exceeded and therefore the clamping device is taken along in the direction of movement and, in the next deflection phase, forms the new point of support, now displaced in the direction of movement. If the sequence is reversed instead of the control profile comprising "slow deflection, rapid contraction", the direction of movement of said linear motor is also reversed.

One disadvantage of this method is the dependence of the deflection on the magnitude of the current static friction of the clamping element. Particularly if the static friction changes due to the ingress of oil or dirt, the desired precision or indeed the entire functioning ability of the adjusting device may be lost. Moreover, as with all mechanical systems in which two surfaces rub against one another, the system is prone to wear over the long term and hence to changes in system properties.

JP 2000 314402 A discloses an actuator device for producing a linear movement, having a hydraulic actuator, which comprises a first piston element for actuating the actuator and a second piston element for producing the linear movement, which piston elements are assigned respective fluidically coupled working chambers, the volumes of which can be changed by movement of the respective piston element. In this case, a piezoelectric actuator is provided for exerting a force on the first piston element. Moreover, the respective working chambers are connected by two oppositely oriented check valves. JP 2001 012402 A discloses an actuator device having two piston elements, which are assigned respective fluidically coupled working chambers. A respective volume of the working chambers can be changed by movement of the respective piston element. A magnet element for exerting a force on one of the piston elements is furthermore provided.

DE 10 2008 046 562 A1 discloses a hydraulic linear drive having a piston, which is mounted slidably in a cylinder, wherein the cylinder has an inlet, via which a fluid can be introduced into the cylinder by a pumping device. The cylinder furthermore has an outlet, via which fluid can be removed from the cylinder. Provision is made here for a piezoelectric and/or magnetostrictive actuator to be provided to drive the pumping device.

An actuator having an electrostrictive body can be taken as known from JP S62 28507 A. A rod can be moved by the electrostrictive body.

Finally, EP 1 190 829 A2 discloses an actuator device for producing a linear movement, having a piston which is arranged in a cylinder. The piston can be moved by subjecting the piston to a pressure by a working fluid. Here, the working fluid is put under pressure by a driving force of a piezoelectric element in order to drive the piston.

SUMMARY

One potential object is to provide an actuator device and a method of the type stated at the outset which allow the production of well-defined linear movements in a particularly simple, low-cost, precise and wear resistant manner.

The inventors propose an actuating device of this kind for producing a linear movement comprises a hydraulic actuator having a first piston element for actuating the actuator and a second piston element for producing the linear movement, which piston elements are assigned respective fluidically coupled working chambers, the volumes of which can be changed by movement of the respective piston element. A piezoelectric actuator is furthermore provided for exerting a force on the first piston element. Coupling piezoelectric control and hydraulic transmission allows particularly precise production of linear movements. In particular, the two piston elements can be configured in such a way that the force which the piezoelectric element produces can be transmitted with a predetermined ratio. The advance of the second piston element as a reaction to the piezoelectric actuation is also then subject to such a ratio, and therefore relatively large forward movements of the piezoelectric element can be converted into relatively small piston movements, for example, leading to particularly precise positioning of the second piston element and of elements connected thereto. As a result, the actuator device described is suitable especially for high precision adjusting operations and the like.

The respective working chambers are connected to one another by two oppositely oriented check valves. To permit controlled transfer of the working fluid between the working chambers. According to the proposal, the two check valves have different opening forces.

It is furthermore expedient if the working chamber of the first piston element is coupled to a reservoir for a working fluid of the hydraulic actuator via a restrictor element. By the device described, the following possibility for producing linear movements which go beyond even the range of movement of the piezoelectric element itself is obtained. In a first phase of movement, the piezoelectric element is controlled in such a way that it produces a rapid movement. The rapid movement is transmitted to the first piston and produces a pressure in the working fluid which is sufficient to open the valve between the working chambers in the direction of the second working chamber. Fluid then flows into the second working chamber and there moves the second piston element, producing the desired forward motion.

In a second phase of movement, the piezoelectric element is moved slowly counter to the direction in which it was moved in the first phase of movement. Although the first piston element is thereby likewise pulled back in the opposite direction, the slow movement means that the check valve oriented from the second to the first working chamber does not open. On the contrary, the resulting change in volume in the first working chamber is compensated for by the reservoir through the restrictor element. The piezoelectric element and the first piston element are thus reset to the initial position thereof, while the second piston element remains in its position.

By repeating the two phases alternately, any desired further forward movement of the second piston element exceeding the actual range of movement of the piezoelectric actuator can be achieved. This allows particularly precise positioning of the second piston element over long linear paths of movement and simultaneously entails the advantage that no energy has to be expended to maintain a predetermined position of the second piston element. Moreover, in contrast to the actuators described at the outset, based on the inchworm principle, the sequence of motion is independent of the static friction of the participating components and is therefore not impaired by contamination, oil ingress or the like.

In this case, the working chambers can expediently be formed by respective cylinders, in which the pistons are movably accommodated. One alternative to this is the formation of the working chambers by respective bellows, which are coupled to the piston elements. In this embodiment, all the essential moving parts of the actuator device are encapsulated and thus protected from contamination, resulting in operation of the device in a manner which is more reliable and subject to less wear over the long term.

The inventors furthermore propose a method for setting a position of a linearly movable element, in which a force is exerted on a first piston element by a piezoelectric actuator, wherein the volume of a working chamber assigned to the first piston element is changed by the exertion of the force, and the force applied is transmitted to a second piston element, the associated working chamber of which is fluidically coupled to the first working chamber.

As already described in respect of the device, a movement of a linearly movable element coupled to the second piston element exceeding the range of movement of the piezoelectric actuator itself is made possible in this way. As already explained above, to achieve this a movement in a predetermined direction is carried out by moving the piezoelectric actuator so quickly in the predetermined direction in a first phase of movement that the pressure produced in the first working chamber by the movement overcomes the closing force of a check valve fluidically connecting the working chambers in the direction of movement. The movement of the piezoelectric actuator is thus transmitted to the second piston element in the first phase of movement.

In a second phase of movement, the piezoelectric actuator is moved so slowly counter to the predetermined direction that the pressure produced in the first working chamber by the movement does not overcome the closing force of a check valve fluidically connecting the working chambers counter to the direction of movement. In contrast to the first phase of movement, the two working chambers are not fluidically connected here, and the movement of the piezoelectric actuator is thus not transmitted to the second piston element. As already explained, it is possible in this way to produce a movement which goes beyond the actual range of movement of the piezoelectric actuator, it being possible for this to be further amplified or, alternatively, reduced by the ratio between the two piston elements.

In order to compensate for the change in volume in the first working chamber during the second phase of movement, working fluid is fed to the first working chamber from a reservoir or discharged from said chamber to the reservoir via a restrictor element during the second phase of movement.

The first and second phases of movement are preferably repeated alternately until the second piston element is in a predetermined setpoint position. In the manner described, it is thus possible to achieve linear movements of any length which are limited only by the range of movement of the second piston element but not by the maximum deflection of the piezoelectric actuator. Overall, the method allows particularly precise production of linear movements with as little wear as possible and with a particularly compact mechanical construction of the device on which it is based.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
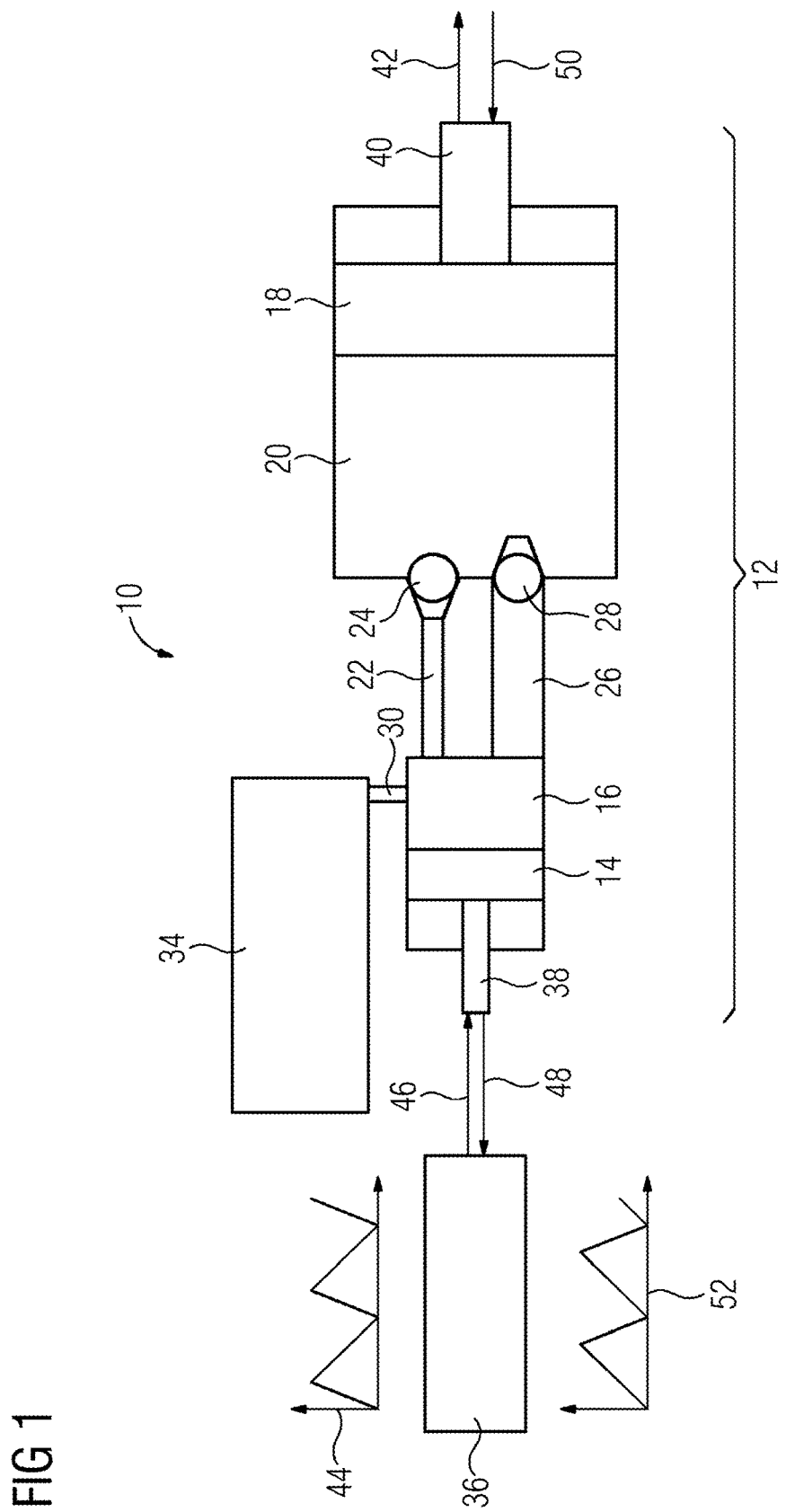
FIG. 1 shows a schematic representation of an illustrative embodiment of a device having hydraulic cylinders as hydraulic actuators.

Reference will now be made in detail to the preferred embodiments of the present invention, examples of which are illustrated in the accompanying drawings, wherein like reference numerals refer to like elements throughout.

A device, denoted overall by 10, for producing a linear movement, e.g. for adjustment tasks, comprises a hydraulic actuator 12, a first piston 14, which is accommodated movably in an associated accommodation space 16, and a second piston 18, which is supported movably in a second accommodation space 20. Accommodation space 16 is connected to the second accommodation space 20 by a first line 22 containing a one-way valve 24, which opens in the direction of the second accommodation space 20. A second line 26 containing a second one way valve 28, which opens in the direction of the first accommodation space 16, connects the second accommodation space 20 to the first accommodation space 16. The first accommodation space 16 is furthermore connected to a reservoir 34 for operating fluid by a line 30, which includes a restrictor element 32.

To actuate the first piston 14, a piezoelectric actuator 36 is provided. A force exerted on the piston rod 38 of the first piston 14 by the piezoelectric actuator 36 is transmitted hydraulically by the first piston 14 to the second piston 18, the piston rod 40 of which is coupled to the element to be moved.

In order to bring about a movement in the direction of arrow 42, the piezoelectric actuator 36 is controlled in accordance with the force/time diagram 44. In a first phase of movement, the piezoelectric actuator 36 is moved quickly in the direction of arrow 46. The movement is transmitted to the first piston 14, while the pressure thereby produced in the first accommodation space 16 exceeds the closing force of valve 24, with the result that operating fluid crosses from the first accommodation space 16 to the second accommodation space 20 and there exerts a force on the second piston 18, with the result that the latter moves in the direction of arrow 42. In a second phase of movement, the piezoelectric element 36 is pulled back in the direction of arrow 48, but this takes place significantly more slowly than the first phase of movement. As a result, the piston 14 likewise moves in the direction of arrow 48 but the slow movement ensures that the closing force of valve 28 is not exceeded. Thus, no operating fluid crosses from the second accommodation space 20 into the first accommodation space 16, and the second piston 18 maintains its position. The change in volume of the first accommodation space 16 due to the movement of the first piston 14 is compensated for by operating fluid which flows out of the reservoir 34, through line 30 and restrictor 32, into the first accommodation space 16.

Through alternating repetition of the two phases of movement, piston 18 can be pushed further forward than is predetermined by the range of movement of the piezoelectric actuator 36. Here, the ratio between pistons 14 and 18 allows positioning of the second piston 18 with particularly high precision, while it is advantageous that no force has to be expended to hold the piston 18 in position.

Figure 2:
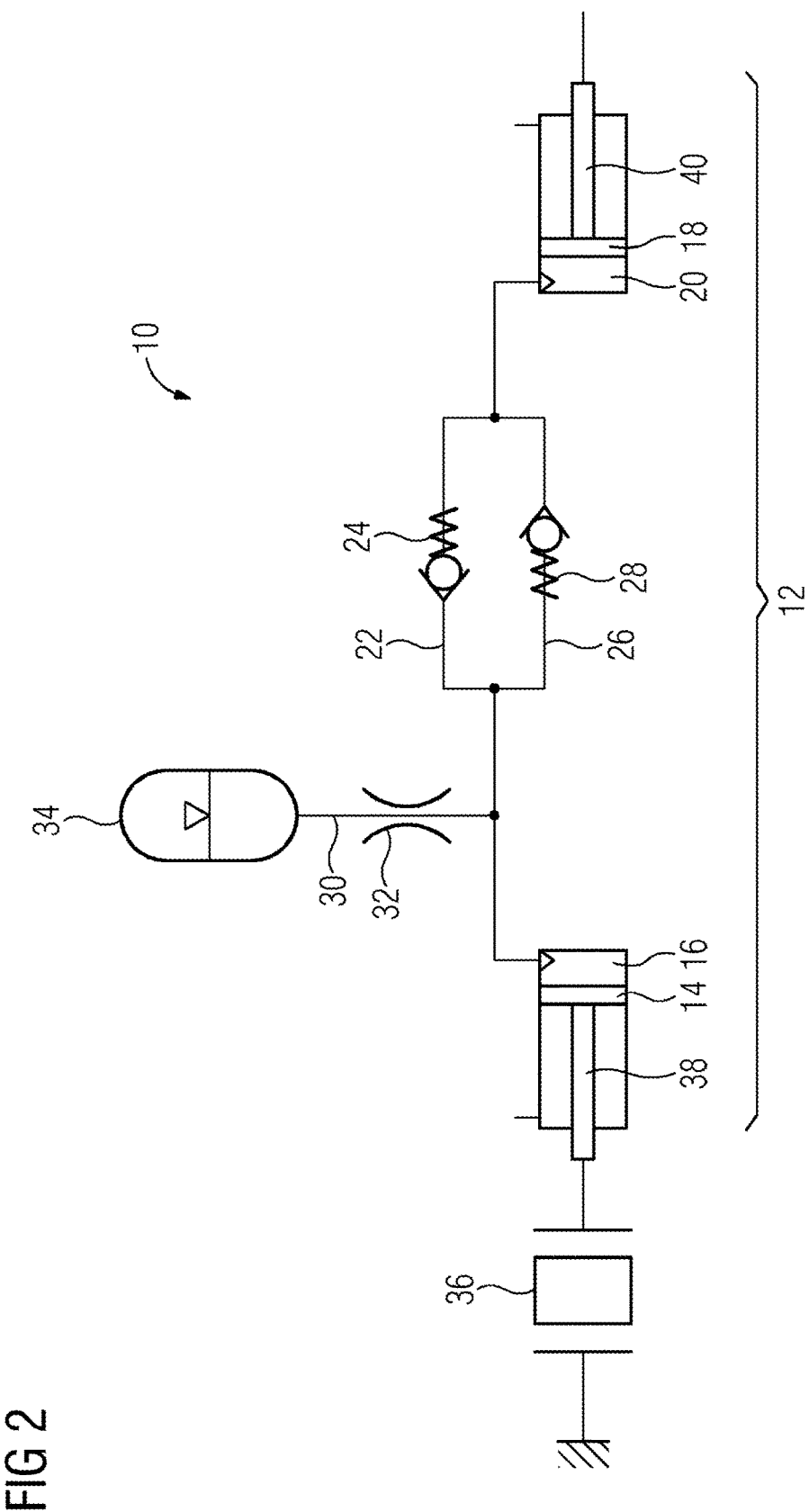
FIG. 2 shows a hydraulic equivalent circuit diagram of the device according to FIG. 1.
Figure 3:
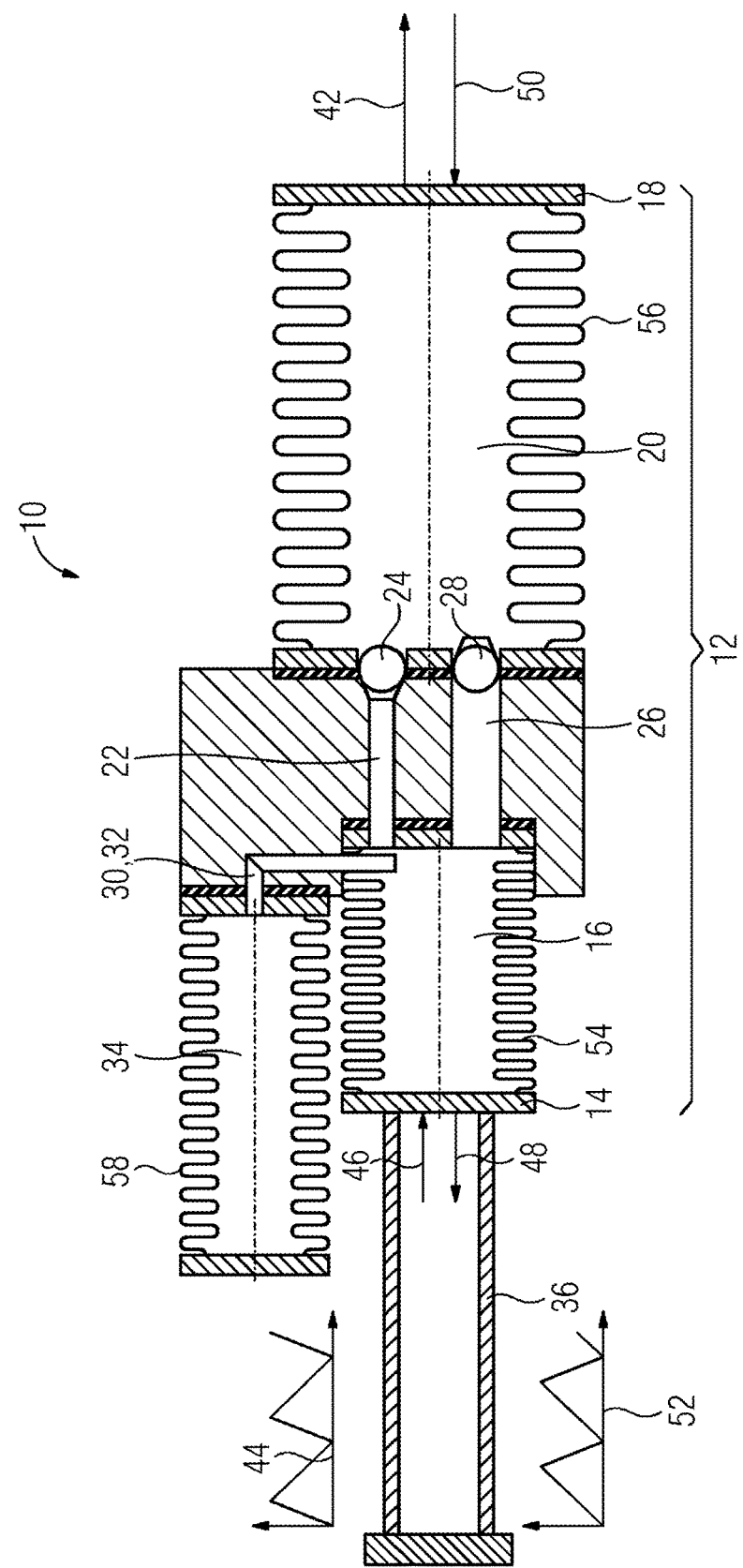
FIG. 3 shows a schematic representation of an alternative illustrative embodiment of a device having bellows as hydraulic actuators.
Figure 4:
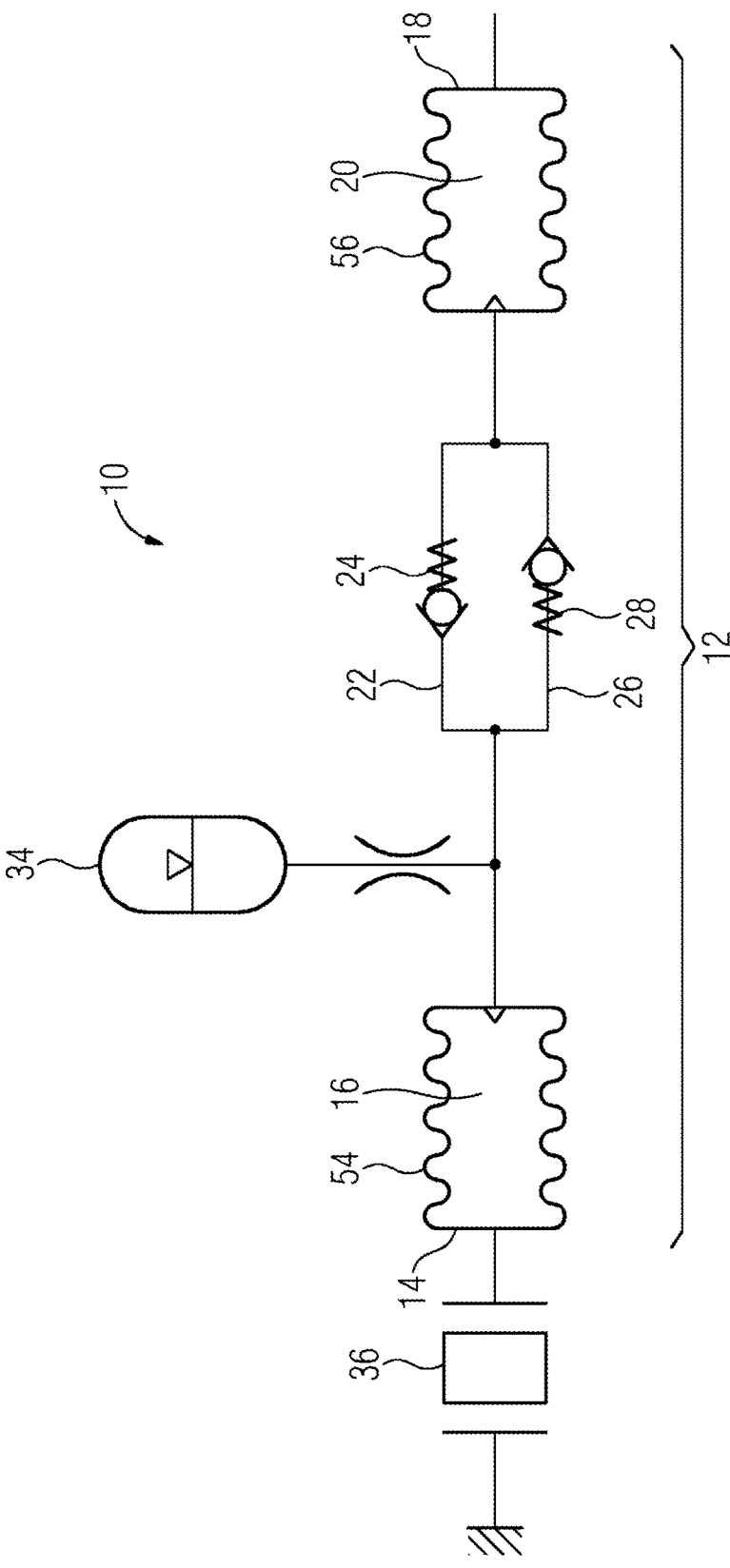
FIG. 4 shows a hydraulic equivalent circuit diagram of the device according to FIG. 3.

If piston 18 is to be pulled back in the opposite direction, i.e. in the direction of arrow 15, the two phases of movement are reversed, as illustrated by the force/time diagram 52. First of all, therefore, the piezoelectric actuator 36 is moved quickly in the direction of arrow 48, so that the resulting change in pressure in the first accommodation space 16 exceeds the closing force of one-way valve 28 and liquid can flow out of the first accommodation space 20 into the first accommodation space 16, causing piston 18 to move in the direction of arrow 50. In the second phase of movement, the piezoelectric actuator 36 is moved slowly in the direction of arrow 46, thereby ensuring once again that the closing force of one way valve 24 is not exceeded, with the result that the second piston 18 maintains its position and hydraulic fluid flows back out of the first accommodation space 16, via the restrictor 32 and line 30, into the reservoir 34. Here too, a further movement of piston 18 can be produced by alternate repetition of the two phases of movement. FIGS. 3 and 4 show an alternative embodiment of the device 10, in which, instead of hydraulic cylinders, use is made of bellows 54, 56, which are connected to the piston elements 14, 18 and thus form the accommodation spaces 16, 20. The reservoir 34 is also formed by a bellows 58. In other respects, the device 10 according to FIGS. 3 and 4 functions in the same way as the device 10 according to FIGS. 1 and 2. The use of bellows 54, 56, 58 makes it possible to construct the entire device 10 in a substantially encapsulated way, ensuring that it has minimum susceptibility to contamination and wear. A device 10 of this kind can therefore be operated for a particularly long time with constant precision.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A hydraulic actuator device for producing a linear movement, the device comprising:
    a first piston element disposed in a first working chamber;
    a second piston element disposed in a second working chamber;
    the first and second working chambers having respective volumes which are changed by movement of the first and second piston elements, respectively;
    two oppositely oriented check valves fluidically connecting the first and second working chambers along separate fluid lines, the oppositely oriented check valves each associated with a different opening force;
    wherein an isolated reservoir is only directly connected to the first working chamber by a third fluid line which includes a single restrictor element; wherein the restrictor element allows fluid flow in to the reservoir and out of the reservoir to the second working chamber via one of the two oppositely oriented check valves; and
    a piezoelectric actuator to exert an input force on the first piston element, and thereby transmit an output force on the second piston through the two fluid lines.

2. The actuator device as claimed in claim 1, wherein the first and second working chambers are formed by respective cylinders, in which the first and second pistons are respectively movably accommodated.

3. The actuator device as claimed in claim 1, wherein the first and second working chambers are formed by respective bellows.

4. The actuator device as claimed in claim 1, wherein the second piston element has a larger cross sectional area than the first piston element.

5. A method for setting a position of a linearly movable element, the method comprising:
    exerting a force on a first piston element disposed in a first working chamber by actuating a piezoelectric actuator;
    changing a volume of the first working chamber by a movement of the first piston element in response to the force exerted on the first piston element; and
    transferring a working fluid between the first working chamber and a second working chamber assigned to the second piston element through two separate fluid lines, each fluid line including a check valve, the two check valves oppositely oriented and associated with a different opening force;
    wherein to produce a movement in a predetermined direction, the piezoelectric actuator is moved at a first speed in the predetermined direction in a first phase of movement resulting in a pressure produced in the first working chamber by the first phase of movement overcoming a closing force of a first check valve fluidically connecting the first and second working chambers in the predetermined direction of movement, wherein, in a second phase of movement, the piezoelectric actuator is moved at a second speed slower than the first speed counter to the predetermined direction resulting in a pressure produced in the first working chamber by the second phase of movement does not overcome a closing force of a second check valve fluidically connecting the first and second working chambers counter to the predetermined direction of movement; and exchanging the working fluid between the first working chamber and an isolated reservoir through a single restrictor element to compensate for a change in volume in the first working chamber during the second phase of movement; wherein the isolated reservoir is only directly connected to the first working chamber by a third fluid line which includes the single restrictor element; wherein the restrictor element allows fluid flow in to the reservoir and out of the reservoir to the second working chamber via one of the two oppositely oriented check valves.

6. The method as claimed in claim 5, wherein the first and second phases of movement are repeated alternately until the second piston element is in a predetermined setpoint position.

7. A method for setting a position of a linearly movable element, comprising:

exerting a force on a first piston element by a piezoelectric actuator;

changing a volume of a first working chamber assigned to the first piston element by the force exerted on the first piston element; and transmitting the force exerted on the first piston element, to a second piston element by transferring fluid between the first working chamber and a second working chamber assigned to the second piston element, and exchanging the working fluid between the first working chamber and an isolated reservoir through a single restrictor element in communication only with the first working chamber to compensate for a change in volume in the first working; wherein the isolated reservoir is only directly connected to the first working chamber by a third fluid line which includes the single restrictor element; wherein the restrictor element allows fluid flow in to the reservoir and out of the reservoir to the second working chamber via one of the two oppositely oriented check valves; wherein decreasing the volume of the first working chamber with the piezoelectric actuator moving at a first speed overcomes a closing force of a first check valve allowing fluid to move from the first working chamber to the second working chamber, increasing the volume of the first working chamber with the piezoelectric actuator moving at the first speed overcomes a closing force of a second check valve allowing fluid to move from the second working chamber to the first working chamber, increasing the volume of the first working chamber at a second speed slower than the first speed moves fluid to the first working chamber from the reservoir, and decreasing the volume of the first working chamber at the second speed moves fluid from the first working chamber to the reservoir.

8. The method as claimed in claim 7, wherein to move the second piston element in a first direction, the volume of the first working chamber is repetitively increased at the first speed then decreased at the second speed, and to move the second piston element in a second direction opposite the first direction, the volume of the first working chamber is repetitively increased at the second speed then decreased at the first speed.

9. The method as claimed in claim 7, wherein the second piston element has a larger cross sectional area than the first piston element.

* * * * *